United States Patent [19]
Koch et al.

[11] Patent Number: 4,737,953
[45] Date of Patent: Apr. 12, 1988

[54] LOCAL AREA NETWORK BRIDGE

[75] Inventors: Steven R. Koch, Seabrook, Md.; Charles R. Stein, Schenectady, N.Y.; William T. Hatfield, Schenectady, N.Y.; Neil R. Shapiro, Schenectady, N.Y.; William C. Hughes, Scotia, N.Y.

[73] Assignee: General Electric Company, Schenectady, N.Y.

[21] Appl. No.: 892,601

[22] Filed: Aug. 4, 1986

[51] Int. Cl.$^4$ .............................................. H04J 3/26
[52] U.S. Cl. ...................................... 370/94; 370/85
[58] Field of Search ...................... 370/94, 85, 88, 92; 340/825.52, 825.53

[56] References Cited

U.S. PATENT DOCUMENTS

| | | |
|---|---|---|
| 3,890,471 | 6/1975 | Hachenburg .......................... 370/89 |
| 4,535,450 | 8/1985 | Tan ........................................ 370/85 |
| 4,577,313 | 3/1986 | Sy ........................................ 370/88 |
| 4,597,078 | 6/1986 | Kempf .................................. 370/85 |
| 4,672,607 | 6/1987 | Nakayashiki et al. ................ 370/89 |

OTHER PUBLICATIONS

"An Introduction to Local Area Networks", by D. Clark et al., Proceedings of the IEEE, vol. 66, No. 11, Nov. 1978, pp. 1497-1517.

Intel Microcommunication Handbook, published by Intel Corporation, 1985, pp. 11-19-11-31.

"Dual-Chip Sets Forge Vital Link For Ethernet Local-Network Scheme" by Hindin, Electronics, Oct. 6, 1982, pp. 89-103.

"2-Chip Controller Set Drives Down Ethernet Hookup Costs" by Arst et al., Data Communications, Oct. 1982, pp. 163-172.

"'Bridges' Smooth Troubled Waters for Wide-Area Networking" by Hart, Data Communications, Mar. 1985, pp. 209-220.

Primary Examiner—Douglas W. Olms
Attorney, Agent, or Firm—Richard V. Burgujian; James C. Davis, Jr.; Paul R. Webb, II

[57] ABSTRACT

A method for operating a communication network bridge is disclosed. The bridge receives a message frame from a first network connected thereto and reads the source and destination addresses of the received frame. The bridge determines if the addresses are contained in a source address table maintained thereby and if both addresses are present, discards the frame. The bridge transmits the frame to a second network connected thereto if the source address is not in the table or if the source address but not the destination address is in the table.

16 Claims, 3 Drawing Sheets

LOCAL AREA NETWORK BRIDGE

LOCAL AREA NETWORK BRIDGE

The invention relates, in general, to an apparatus and a method for bridging between two or more local area communication networks and more specifically to a bridge which learns the identities of the devices on the local area networks it interconnects.

BACKGROUND OF THE INVENTION

Local area networks (LANs) to enable local communication among computing stations and computer related devices are well known in the art. The reference entitled "An Introduction to Local Area Networks" by D. Clark et al, Proceedings of the IEEE, Vol. 66, No. 11, pp. 1497–1517, November 1978, provides a general description of local area networks and their operation and is incorporated in its entirety herein by reference. Generally, message packet switching schemes are employed on LAN's to enable transmission of information between devices connected to the LAN. Data is packetized and formed into message frames which include, in addition to the information being transmitted, device source and destination addresses that respectively identify the device transmitting the message and the device to which the message is being transmitted. The devices connected to a LAN normally have unique address identifications to enable such source and destination addressing. The manner in which user information is transmitted between devices on the LAN and the method for properly formating the message frames are well known in the art and do not form part of the present invention.

LANs are implemented using a variety of network topologies and control structures, the control structure determining how the different devices connected to a network may achieve access thereto. Such topologies and control structures are described in the above-cited reference by Clark et al.

For a variety of reasons, described in Clark et al., it is desirable under certain circumstances to interconnect discrete LANs by means of communication bridges. A bridge interconnecting two LANs acts as a filter by transmitting only message frames, received on one side of the bridge, having a destination address of a device located on the other side of the bridge. A bridge includes, typically, two transceivers, each transceiver operating to transmit message frames to and receive frames from one of the two LANs the bridge interconnects. Note that while the transceivers are essential components that enable receipt and transmission of message frames, they are not always considered an integral part of a bridge by those skilled in the art. Bridges also include means for interfacing with the respective control structures of the LANs they interconnect. Additionally, bridges include means for performing the message frame filtering discussed above.

In order for a bridge to effectively filter message frames, it must know the address identities of the devices located on the LANs it interconnects. In general, in the case of a communication system comprising multiple LANs interconnected by bridges, each bridge must know the address identities of all devices in the system which communicate between LANs and the respective locations of such devices relative to the bridge. FIG. 1 illustrates a communication system 50 comprising LANs 52, 54 and 56 as well as other LANs that system 50 may include but that are not shown. Bridges 58 and 60 respectively interconnect LANs 52 and 54 and LANs 54 and 56. Note that LANs are generally not interconnected by bridges so as to form a loop. For illustrative purposes, it is helpful to view bridge 58 as consisting of sides 62 and 64 and bridge 60 as consisting of sides 66 and 68. Then, bridge 58 needs to know the locations of devices on system 50 relative to its bridge sides 62 and 64 while bridge 60 needs to know device locations relative to its bridge sides 66 and 68. For example, bridge 58 needs to know that devices connected to LANs 54 and 56, as well as devices connected to LANs beyond LAN 56, are located on its side 64 while devices on LAN 52 and LANs beyond LAN 52 are located on its side 62. Thus, if a message frame transmitted by a source device on LAN 52 has as its destination a device connected to LAN 56, bridge 58, in determining whether to transmit the message frame through, needs to know that the source device is on bridge side 62 and the destination device is located on side 64.

Typically, a bridge includes means for storing a list of device address identifications, and their respective locations relative to the sides of the bridge, in order to enable the bridge to filter message frames. This poses an immediate problem should devices be added to or deleted from a LAN or if a device is moved from one LAN to another relative to the sides of any bridge in the communication system. Such changes need to be accounted for in order to maintain the operating efficiency of the bridge and the LANs it interconnects. One solution to the problem is to have a human system administrator keep track of such changes and effect appropriate adjustments in the respective bridge list storing means. Such a solution requires record keeping and periodic assessment of device identities on the interconnected LANs.

Another solution, known in the art, is to provide a bridge which upon initial operation of the communication system enters a listening period during which it accumulates but does not transmit message frames. The bridge reads the source and destination addresses of the accumulated message frames and forms a database of device addresses and locations relative to the sides of the bridge. When the bridge leaves the listening mode, it determines, in accordance with the device address database, which of the accumulated frames require transmission and so dispositions them. The bridge determines in the same fashion whether or not to transmit subsequently arriving message frames. With respect to the addition of new devices to the LANs in the communication system, it is necessary for the new device to broadcast an introductory "Hello" message to apprise the bridges and devices comprising the system of its presence. The bridge is adapted to be responsive to the "Hello" message to update its address database.

One drawback to the above solution is the substantial transmission delay, during initial operation, resulting from the listening period. A second drawback is the need to generate a "Hello" message in order to update the bridge address database. With reference to the International Standards Organization (ISO) seven layer open systems interconnection model, the "Hello" message would have to be generated by the new device within a protocol layer above the datalink layer. This is undesirable since it is generally preferred to maintain all aspects of bridge operation at and below the datalink layer and thus independent of the higher protocol layers.

OBJECTS OF THE INVENTION

It is a principal object of the present invention to provide new and improved apparatus and method for bridging between LANs which are not subject to the aforementioned problems and disadvantages.

Another object of the present invention is to provide apparatus and method, for bridging between two LANs, that obviate the need to effect adjustments for additions or deletions of devices in either LAN.

A further object of the present invention is to provide apparatus and method, for bridging between two LANs, that do not require a bridge listening period to establish a device address database.

An additional object of the present invention is to provide apparatus and method, for bridging between two LANs, that are independent of protocol layers higher than the ISO datalink protocol layer.

SUMMARY OF THE INVENTION

The foregoing objects are accomplished by the present invention which is directed to a bridge, for interconnecting LANs, that both learns the address locations of devices in the communication system in which it operates and automatically accounts for device additions, deletions and relocations. The bridge is divided into two sides, each side performing substantially the same functions and connected to receive message frames from one of the two LANs interconnected by the bridge. Either bridge side, upon receiving a message frame, reads the source and destination addresses contained therein. Each bridge side maintains a table of source addresses only of devices located on a LAN connected to that side of the bridge. Thus, following reading the addresses, the bridge side receiving the frame determines whether either the source or destination address of the received message frame is in its source address table. If the source address contained in the received message frame is not present in the table, the receiving bridge side learns the location of the frame sending device by adding the source address to the table. The message frame is then transmitted by the bridge. If the source address is present in the table, the message frame is either transmitted or discarded depending on whether the destination address is respectively not present or present in the table. Additionally, when it is decided to transmit the message frame, the bridge side that did not receive the message frame determines whether the source address is present in the source address table it maintains. If the address is present, indicating the frame sending device was previously located on a LAN connected to the nonreceiving bridge side, that side deletes the source address from its table.

These and other objects of the invention, together with the features and advantages thereof, will become apparent from the following detailed description when read together with the accompanying drawings in which applicable reference designations have been carried forward.

DESCRIPTION OF THE INVENTION

Figure 1:
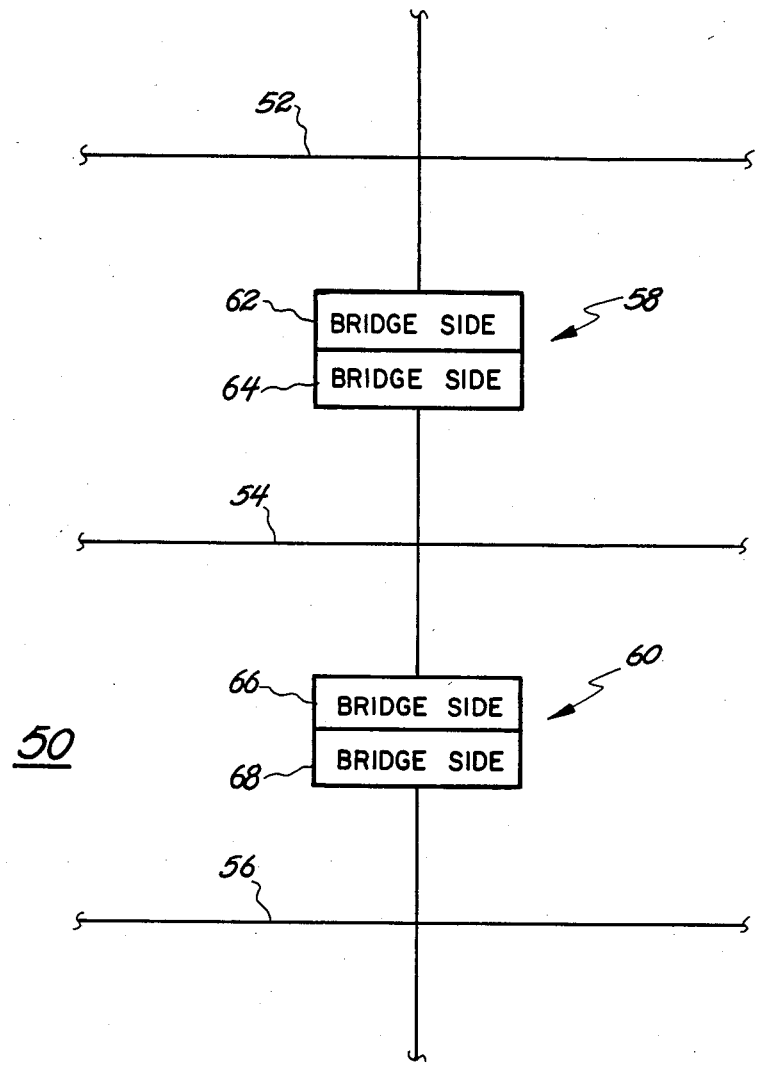
FIG. 1 is a schematic illustration of an exemplary communication network.

As discussed above, FIG. 1 illustrates communication system 50 comprising multiple LANs and bridges. Only portion of LANs 52, 54 and 56 are shown and their respective topologies and control structures are not germane to the present invention. It is assumed bridges 58 and 60 are each constructed to include the general features, discussed above, to accommodate the respective topologies and control structures of the LANs in system 50. Each bridge side operates in a promiscuous mode and receives all message frames present on the LAN to which it is connected. This includes message frames transmitted between devices on the same LAN as well as frames transmitted by a device on one LAN intended for reception by a device on a different LAN. When a bridge side receiving a message frame determines the frame is to be transmitted through the bridge, it provides a signal to the other side of the bridge and the latter bridge side transmits the message frame onto the LAN connected thereto.

The method of the present invention determines how the filter function is to be performed by the bridge. In accordance with this method, each bridge side develops and maintains a source address table containing addresses of devices, in communication system 50, that are sources of message frames. The table maintained by each bridge side contains addresses of devices on the proximate LAN to which the bridge side is connected as well as on LANs connected to that LAN by other bridges. For example, the source address table maintained by side 64 of bridge 58 contains the addresses of devices connected to its proximate LAN 54, as well as devices connected to LAN 56 and other LAN's connected, by other bridges, beyond LAN 56.

Figure 2:
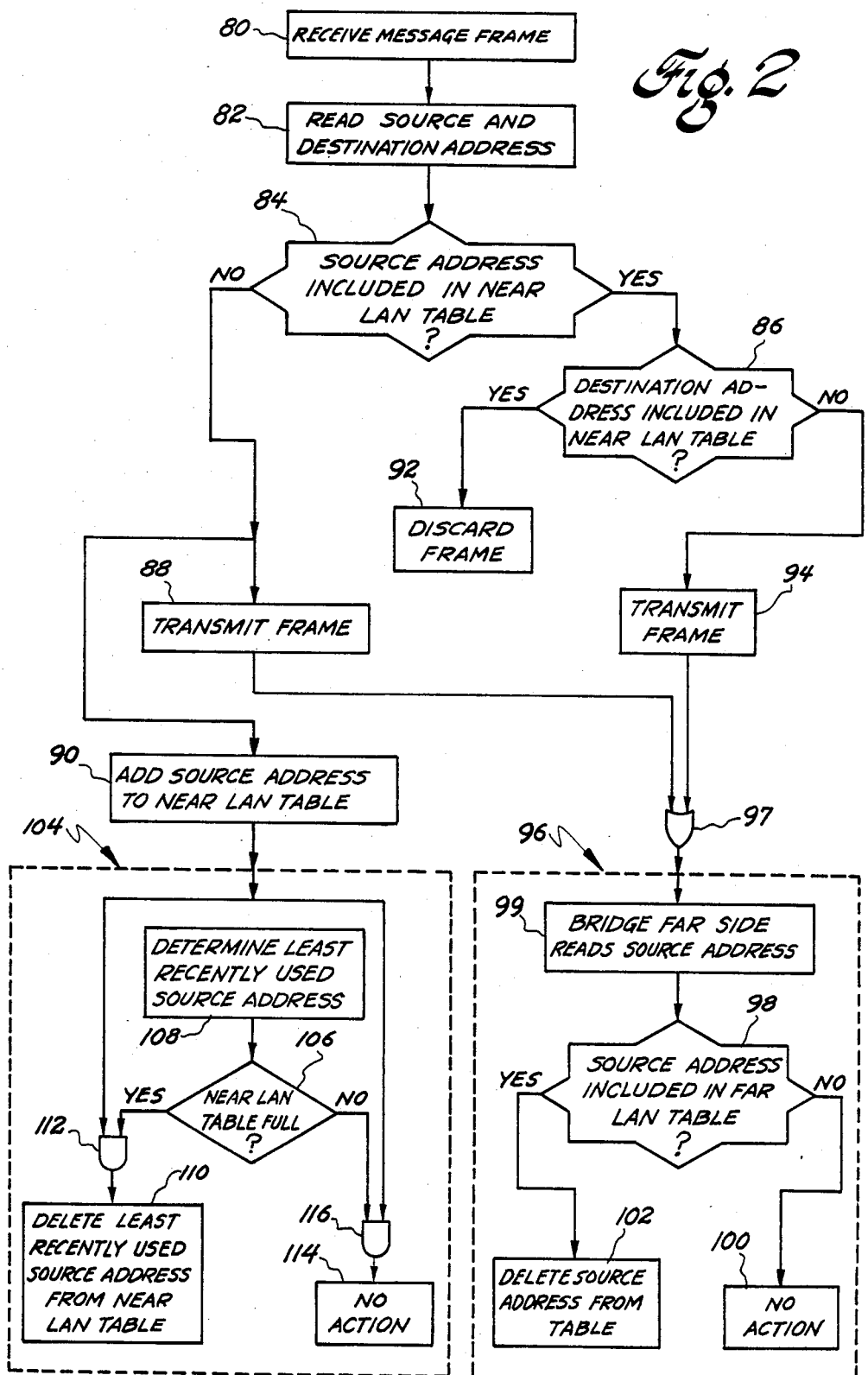
FIG. 2 is a flow diagram illustrative of the method of the present invention.

FIG. 2 is a flow diagram illustrating the operating steps followed by each bridge side in accordance with the method of the present invention. The method commences with step 80 in which a message frame is received. Next, in step 82 the bridge side reads the source and destination addresses contained in the received frame. The bridge side then determines, in steps 84 and 86, respectively whether the source and destination addresses are in the source address table it maintains. In FIG. 2, for the purpose of distinguishing between bridge sides, the side of the bridge receiving the message frame is the "near" side and the source address table maintained by the near side is designated the near LAN table. The other bridge side, not receiving the frame, is the "far" side and its source address table is designated the far LAN table.

If the source address is not found in the near LAN table, this indicates the device is newly added relative to the bridge near side or has been inactive for an extended period. With reference to step 84, when the source address is not found in the near LAN table, the bridge near side dispositions the message frame as transmissible and the frame is passed to the far bridge side for transmission to the LAN connected thereto, in step 88. Thus the message frame is transmitted through the bridge. Additionally, when the source address is not present in the near LAN table, step 90 is performed in which the source address is added to that table. By performing step 90, the bridge near side "learns", for future reference, that the device corresponding to the particular source address is connected to a LAN on the near side of the bridge.

Note that the frame is transmitted irrespective of whether or not the destination address is included in the near LAN table. Thus, even if the destination address is present in the near LAN table, indicating that the device associated therewith is connected on the same side of the bridge as the source device, the frame is still transmitted through the bridge. This is performed to enable other bridge receiving sides in the communication system to add the address of the source device to their respective source address tables and thereby "learn" the location of the source device relative thereto. As a result, in a communication system, such as system 50, comprising multiple LAN's interconnected by bridges all operating in accordance with the method of the present invention, address information concerning a new source device is transmitted to all bridges, with respect to which the device is a source, for addition to their respective source address tables. For example, the initial transmission of a device on LAN 52 having a destination also on LAN 52 results in the device source address being added to the address table maintained by bridge side 62 in accordance with step 90. Further, in accordance with step 88, the message frame is transmitted through bridge 58. Bridge side 66 of bridge 60 receives the message frame and performs step 90 of the present method, resulting in the device address being added to the address table maintained by bridge side 66. Bridge 60 also transmits the message frame so that other bridges in system 50 can add the new source device address to their respective address tables.

If the source address is present in the near LAN table, i.e., the source device has previously transmitted a message frame, the bridge side receiving the frame must also consider, at step 86, whether or not the destination address is present in the near LAN table. If the destination address is also present in the near LAN table, the near bridge side, at step 92, discards the frame This is the correct action since both the source and destination of the message frame are on the same side of the bridge. If the destination address is not present in the near LAN table, the bridge portion dispositions the frame as transmissible and the frame is transmitted through the bridge in step 94. Note that if the destination device is new, i.e., it has never transmitted a message frame, and it is connected to a LAN on the near side of the bridge, transmission through the bridge is not a necessary action. However, there are no adverse consequences from this transmission, other than the lost bridge capacity attributable to the transmission. The destination device receives the message frame, its address as a source relative to the bridge near side will be established upon its initial transmission and no erroneous source address table entries occur in the communication system.

It is also necessary for the method of the present invention to accommodate the relocation of a device from one LAN to another within the same communication system. In the preferred embodiment of the present invention, this is accomplished by an additional group of method steps 96. The steps in group 96 are performed only if it is determined the message frame is to be transmitted through the bridge. This is symbolically indicated by an OR gate 97 which has as inputs the occurrence of steps 88 and 94 and an output applied to group 96. Thus, the steps in group 96 have no impact on the determination whether to transmit or discard a frame. As discussed above, once the bridge near side decides a message frame is to be transmitted, the frame is passed to the bridge far side which proceeds to transmit the message. However, the bridge far side additionally performs the steps in group 96. Group 96 commences with step 99 wherein the message frame source address is read by the bridge far side. Next, in step 98 the bridge far side determines whether the source address included in the message frame is present in the source address table it maintains, which, from the viewpoint of the bridge near side receiving the message frame, is the far LAN table. If the source address is not found in the far LAN table, no action is required as indicated at step 100. However, if the source address is found in the far LAN table, step 102 is performed in which the source address is deleted from the far LAN table by the bridge far side. The effect of group 96 is illustrated by the following example. Referring again to FIG. 1, initially a device is connected to LAN 52 and because of the message frames it transmits, its address is included in the source address tables of bridge sides 62 and 66 of bridges 58 and 60, respectively. Subsequently, the device is relocated and connected to LAN 56. Upon its initial transmission of a message frame, bridge side 68 both adds the device address to its source address table, i.e. the near LAN table, and passes the frame to bridge side 66 for transmission, in performing steps 84, 88 and 90. Bridge side 66 reads the frame source address at step 99 and then performs step 98, finding the device address present in its source address table, i.e., the far LAN table. It therefore proceeds to step 102 in which the address is deleted from that table. Since the message frame is transmitted by bridge 60, it is received by bridge side 64 of bridge 58 where essentially the same steps occur. In bridge 58, side 64 adds the device address to its source address table and passes the received frame to side 62 where the address is found in the source address table and deleted. Thus, as illustrated by the above example, by operation of the steps in group 96, the bridge sides adjust their respective source address tables in response to the relocation of a device from one LAN to another.

The operation of the method of the present invention may be further enhanced by a group of steps 104. With respect to group 104, it is assumed that the design of each bridge side limits its source address table to a predetermined number of source addresses which may be less than the total number of source devices, relative thereto, on the communication system. Thus, as discussed above, in a communication system such as system 50 having multiple LANs interconnected by bridges, devices located to one side of a particular bridge, even if on a LAN interconnected thereto through another bridge, appear as sources to the particular bridge side. As a result, in an active system where most devices are communicating, the source address table fills to the predetermined number of source addresses. As part of group 104, step 106 is performed whereby each bridge side keeps track of whether its source address table is full. Also, in step 108, each bridge side determines the least recently used source address in its source address table. Then, in an active system, the address of a device, which as a result of deactivation or relocation is no longer a source device with respect to a bridge side, quickly becomes the least recently used source address in the source address table of such a bridge side. Then, when the bridge side performs step 90, i.e., adds a source address to its source address table and the bridge portion has determined the table is full (step 106), step 110 is performed in which the least recently used source address is deleted from the table to make room for the source address being added to the table. An AND gate 112, included in group 104, symbolizes testing the concurrence of step 90 and the full status of the table. If step 90 is performed but the table is not full, then as indicated at step 114, no action is taken. An AND gate 116 symbolizes testing the concurrence of step 90 and the not-full table status.

Thus, relocated devices may be deleted from source address tables by operation of group 104, thereby rendering the steps in group 96 unnecessary. However, since successful operation of group 104 depends on the source address table filling to capacity, it cannot necessarily be relied on as the sole means for deleting relocated devices from source address tables. In this respect, it is preferred herein that the operation of group 104 be only supplementary to group 96. Note that group 104 is of value with respect to deleting source addresses of devices that are no longer in use. As a result, space in the source address tables is made available for active devices in the communication system.

Figure 3:
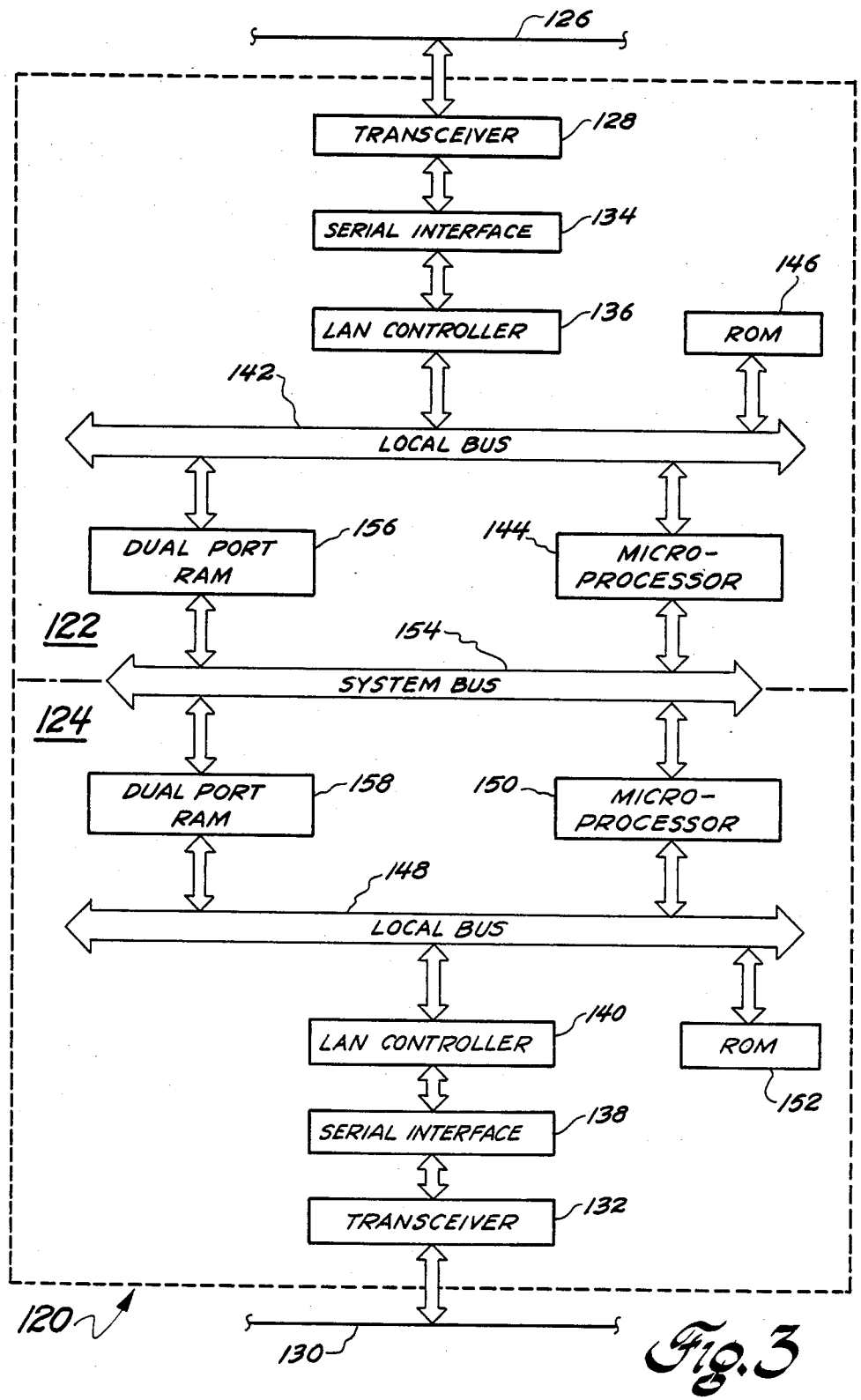
FIG. 3 is an illustrative block diagram of one embodiment of the apparatus of the present invention.

FIG. 3 illustrates the essential elements of a bridge 120 which can be operated in accordance with the method of the present invention. Bridge 120 is divided into two substantially identical sides 122 and 124 which are respectively connected to a LAN 126 through a transceiver 128 and to a LAN 130 through a transceiver 132. Each transceiver transmits on and receives from the LAN, to which it is connected, message frames in bit-serial form. Each transceiver is further adapted to sense the carrier and message frame collisions on the LAN as may be required by the LAN access control structure. While transceivers 128 and 132 are indicated as integral elements of bridge 120, it is understood, as discussed above, that they are sometimes considered to be external to the bridge by those skilled in the art. Side 122 includes a serial interface 134 connected to transceiver 128 and a LAN controller 136 connected to the serial interface. Side 124 similarly includes a serial interface 138 connected to transceiver 132 and a LAN controller 140 connected to the serial interface. Each serial interface is adapted to decode received messages and encode messages for transmission such as where Manchester encoded signals are present on the LAN. Each serial interface additonally provides collision and carrier presence signals suitable for reception by the LAN controller. The function of each LAN controller is described below in further detail.

Bridge side 122 further includes a local bus 142 to which LAN controller 136, a microprocessor 144 and a read only memory (ROM) 146 are connected. Bridge side 124 includes a similar configuration consisting of a local bus 148, a microprocessor 150 and a ROM 152. Each local bus enables communication between the devices connected thereto. Bridge 120 additionally includes a system bus 154 to enable communication between bridge sides 122 and 124 and to which microprocessors 144 and 150 are connected. Bridge side 122 additionally includes a dual-port random access memory (RAM) 156 connected between busses 142 and 154. Bridge side 124 is similarly configured to include a dual-port RAM 158. Each dual-port RAM can be written into or read from either system bus 154 or the local bus to which it is connected. The microprocessor on each side of the bridge operates in accordance with instructions stored in the ROM accessible thereto through the local bus. Each controller generally follows instructions provided to it by its respective microprocessor. On each side of the bridge, the microprocessor and controller communicate with one another through the dual-port RAM. For example, on bridge side 122, microprocessor 144 places instructions for controller 136 in RAM 156 and then sends an interrupt signal to the controller. In response to the interrupt signal, controller 136 retrieves the instructions from RAM 156 and executes them. In a similar manner, each controller provides status information to its microprocessor, e.g., with respect to received message frames, by storing the status information in the RAM and sending an interrupt signal to which the microprocessor responds and accesses the information. A frame buffer area of the RAM is allocated for storage of received message frames. An address storage area of the RAM contains the source address table maintained by each bridge side.

In operation, a message frame is received from the LAN (step 80) by the transceiver, which transmits it, e.g. via twisted pair wire, to the serial interface. The interface decodes the message frame and transmits it to the controller which in turn, via the local bus, stores the frame in the frame buffer area of the RAM at a predetermined RAM address. The controller informs its microprocessor, via information stored in the RAM and an interrupt signal, that a message frame has been received and is stored at the predetermined RAM address. In response to the information, the microprocessor reads, in the RAM, the source and destination addresses of the received message frame (step 82) and refers to the source address table in the address storage area to determine whether the addresses are contained in the table (steps 84 and 86). If the frame is to be discarded (step 92), the microprocessor redesignates as free the portion of the RAM frame buffer area holding the received frame. If the microprocessor determines it is necessary to add the source address to the source address table (step 90), it writes the source address into the address storage area of the RAM. If the frame is to be transmitted (steps 88 or 94), the microprocessor writes, via the system bus, into the RAM on the bridge far side (e.g., microprocessor 144 writes into RAM 158) information indicating that the frame held in the bridge near side RAM at the predetermined RAM address is to be transmitted. The near side microprocessor then sends an interrupt signal to the microprocessor on the bridge far side, hereinafter referred to as the far side microprocessor (e.g., microprocessor 150) which reads the information and transfers the message frame via the system bus into the far side RAM, i.e., the RAM on the bridge far side, (e.g., RAM 158). The far side microprocessor then instructs the controller on its bridge side (e.g., controller 140) to transmit the stored message frame.

In parallel with these operations, the far side microprocessor also reads the source address of the message frame (step 99) and determines whether that address is included in the far side source address table (step 98) maintained in the far side RAM. If the address is not included, the far side processor takes no further action (step 100). However, if the address is found, the far side processor deletes it from the table (step 102).

The operation of bridge 120 can include group of steps 104. In such a case, the near side processor, on the bridge side receiving the message frame, determines whether the source address table is full (step 106) and which source address is least recently used (step 108). Further, the near side processor performs steps 110 and 114 in the manner described above.

Thus, a bridge operating in accordance with the method of the present invention, requires only the source and destination addresses of a received message frame in order to perform its operations. As a result, such a bridge desirably maintains all aspects of its operation within the datalink layer of the above-mentioned ISO seven layer model and is independent of the higher protocol layers of that model.

Bridge 120 may be constructed by one skilled in the art from readily available components. For example, in the case where Ethernet (a trademark of Xerox Corporation) local area networks are being interconnected, the functions of sides 122 and 124 of bridge 120 may each be performed by an Intel ISBC 186/51 communicating computer. The 186/51 computer is generally described in the Intel Microcommunications Handbook published by Intel Corporation, 1985, pps. 11-19 through 11-31 which are incorporated herein by reference. The system bus used to enable communication between the two bridge sides may be any controlled access type bus such as MULTIBUS (a trademark of Intel Corporation) bus. Each 186/51 computer uses an 82501 serial interface, an 82586 LAN controller and an 80186 LAN processor. The operation of these Intel components is further described in the two articles entitled "Dual-Chip Sets Forge Vital Link For Ethernet Local-Network Scheme" by Hindin, Electronics, Oct. 6, 1982, pps. 89-103 and "2-Chip Controller Set Drives Down Ethernet Hookup Costs" by Arst et al, Data Communications, Oct. 1982, pps. 163-172, each of these two articles being incorporated in its entirety herein by reference.

Other components, known to those skilled in the art, are readily available for constructing communication system interface devices and are readily adaptable to enable construction of a bridge in which the method of the present invention may be practiced.

While a method for operating a bridge interconnecting local area networks has been disclosed, the invention is not so limited. The method disclosed herein may readily be adapted by one skilled in the art to practice in a bridge interconnecting communication networks other than local area networks.

While a preferred embodiment has been illustrated and described herein, it will be obvious that numerous modifications, changes, variations, substitutions and equivalents, in whole or in part, will occur to those skilled in the art without departing from the spirit and scope contemplated by the invention. Accordingly, it is intended that the invention herein be limited only by the scope of the appended claims.

What is claimed is:

1. A method for operating a bridge between first and second communication networks, said method comprising the steps of:
    receiving a message frame from said first network;
    reading a source address and a destination address included in said received frame;
    determining whether said source and destination addresses of said received frame are included in a table of source addresses, said table including addresses of devices coupled to said first network;
    discarding said received frame if both said received frame source and destination addresses are included in said table; and
    transmitting said received frame to said second network if said received frame source address is not included in said table or if said received frame source address but not said received frame destination address is included in said table.

2. The bridge operating method of claim 1 and further including the step of:
    adding said received frame source address to said table if said received frame source address is not included therein.

3. The bridge operating method of claim 1 wherein said table is a first table, said method comprising the additional steps of:
    determining whether said received frame source address is included in a second table of source addresses, said second table including addresses of devices connected to said second network; and
    deleting said received frame source address from said second table if it is determined to be already included in said second table.

4. The bridge operating method of claim 3 and further including the step of:
    adding said received frame source address to said first table if it is not included therein.

5. The bridge operating method of claim 2 wherein said table holds no more than a predetermined number of source addresses, said method comprising the additional steps of:
    monitoring the number of source addresses in said table;
    determining a least recently used source address in said table; and
    upon the number of source addresses in said table reaching said predetermined number of source addresses, said method comprising the further step, following said adding step, of:
    deleting said least recently used source address from said table.

6. The bridge operating method of claim 4 wherein said first table holds no more than a predetermined number of source addreses, said method comprising the additional steps of:
    monitoring the number of source addresses in said first table;
    determining a least recently used source address in said first table; and
    upon the number of source addresses in said first table reaching said predetermined number of source addresses, said method comprising the further step, following said adding step, of:
    deleting said least recently used source address from said first table.

7. Apparatus for establishing a bridge between a first and a second communication network, each of said networks being adapted to carry bit-serial message frames between devices coupled thereto, each said message frame including a source and a destination address, said apparatus comprising:
    means for receiving a message frame from said first network;
    means for reading the source and destination addresses included in said received frame;
    means for determining whether said received frame source and destination addresses are included in a table of source addresses maintained by said bridge apparatus, said table including addresses of devices connected to said first network;
    means for discarding said received frame if both said received frame source and destination addresses are included in said table; and means for transmitting said received frame to said second network if said received frame source address is not included in said table or if said received frame source address but not said received frame destination address is included in said table.

8. The bridge apparatus of claim 7 and further including means for adding said received frame source address to said table if it is not already included therein.

9. The bridge apparatus of claim 7 wherein said table is a first table, said bridge apparatus maintaining a second table including addresses of devices connected to said second network, said bridge apparatus further including:
means for determining whether said received frame source address is included in said second table;
means for deleting said received frame source address from said second table if it is determined to be included therein.

10. The bridge apparatus of claim 9 and further including means for adding said received frame source address to said first table if it is not already included therein.

11. The bridge apparatus of claim 8 wherein said table holds no more than a predetermined number of source addresses, said bridge apparatus further including:
means for monitoring the number of source addresses in said table;
means for determining the least recently used source address in said table; and
means for deleting the least recently used source address from said table if the number of addresses in said table reaches said predetermined number and if it is determined said received frame source address is to be added to said table.

12. The bridge apparatus of claim 10 wherein said first table holds no more than a predetermined number of source addresses, said bridge apparatus further including:
means for monitoring the number of source addresses in said first table;
means for determining the least recently used source address in said first table; and
means for deleting the least recently used source address from said first table if the number of addresses in said first table reaches said predetermined number and if it is determined said received frame source address is to be added to said first table.

13. Apparatus for establishing a bridge between a pair of communication networks, each of said networks being adapted to carry bit-serial message frames between devices coupled thereto, each said message frame including a source and a destination address, said apparatus comprising:
a pair of bridge sides each coupled to a respective one of said networks for transmitting and receiving message frames to or from its associated communication network;
each of said bridge sides including:
memory means for storing a message frame;
means for receiving an incoming message frame from or transmitting an outgoing message frame to its associated communication network;
controller means for directing said incoming message frame from said frame receiving means to said memory means or directing said outgoing message frame from said memory means to said frame transmitting means;
processor means for reading the source and destination addresses of said incoming message frame and determining whether said incoming message frame is transmissible from one network to the other, said processor means maintaining a table including addresses of devices connected to its associated network; and
said processor means determining said incoming frame is to be discarded if both said incoming frame source and destination addresses are included in said table, said processor determining said incoming frame is to be transmitted if said incoming frame source address is not included in said table or if said incoming frame source address but not said incoming frame destination address is included in said table.

14. The bridge apparatus of claim 13 wherein said processor means adds said incoming frame source address to said table if that address is not already included therein.

15. The bridge apparatus of claim 14 wherein each of said bridge sides can function as either a receiving bridge side for receiving said incoming message frame or a transmitting bridge side for transmitting said outgoing message frame, said incoming message frame being designated said outgoing message frame upon said processor means on said receiving bridge side determining said incoming frame is to be transmitted;
said processor means on said transmitting bridge side determining whether the source address of said outgoing message frame is included in the table maintained thereby and if included therein said transmitting bridge side processor deleting said outgoing frame source address from the last-recited table.

16. The bridge apparatus of claim 15 wherein each of said tables holds no more than a predetermined number of source addresses;
each of said processor means adapted to monitor the number of source addresses in the table maintained thereby and determine a least recently used source address included therein; and
said processor means on said receiving bridge side deleting said least recently used source address upon the number of addresses in the table maintained thereby reaching said predetermined number and said processor means determining said incoming frame source address is not included in the last-recited table.

* * * * *